United States Patent
Poteet

(10) Patent No.: US 11,450,108 B2
(45) Date of Patent: Sep. 20, 2022

(54) SYSTEMS AND METHODS FOR VIDEO ANALYSIS TOOL FOR COMMUNICATIONS COURSEWORK SCHEDULING AND MANAGEMENT

(71) Applicant: Advanced Solutions Visual Collaboration Systems, LLC, Louisville, KY (US)

(72) Inventor: Tyler Poteet, Louisville, KY (US)

(73) Assignee: Advanced Solutions Visual Collaboration Systems, LLC, Louisville, KY (US)

(*) Notice: Subject to any disclaimer, the term of this patent is extended or adjusted under 35 U.S.C. 154(b) by 175 days.

(21) Appl. No.: 16/885,497

(22) Filed: May 28, 2020

(65) Prior Publication Data

US 2020/0380264 A1 Dec. 3, 2020

Related U.S. Application Data

(60) Provisional application No. 62/855,419, filed on May 31, 2019.

(51) Int. Cl.
*G06K 9/00* (2022.01)
*G06N 3/02* (2006.01)
*G06V 20/40* (2022.01)

(52) U.S. Cl.
CPC ............... *G06V 20/47* (2022.01); *G06N 3/02* (2013.01); *G06V 20/41* (2022.01)

(58) Field of Classification Search
CPC .......... G06V 20/47; G06V 20/41; G06N 3/02
See application file for complete search history.

(56) References Cited

U.S. PATENT DOCUMENTS

| | | | |
|---|---|---|---|
| 2008/0249773 A1* | 10/2008 | Bejar | G10L 15/063 704/243 |
| 2011/0320514 A1* | 12/2011 | Carlough | G06F 7/494 708/505 |
| 2012/0042274 A1* | 2/2012 | Guyon | G06Q 10/0639 715/780 |
| 2016/0049094 A1* | 2/2016 | Gupta | G09B 9/00 434/185 |
| 2019/0035431 A1* | 1/2019 | Attorre | G10L 17/00 |
| 2019/0171871 A1* | 6/2019 | Zhang | G06K 9/6271 |

OTHER PUBLICATIONS

International Search Report and Written Opinion relating to International Application No. PCT/US20/34793 dated Aug. 27, 2020.

* cited by examiner

*Primary Examiner* — David F Dunphy
(74) *Attorney, Agent, or Firm* — Dinsmore & Shohl, LLP

(57) ABSTRACT

Video analysis tool systems and methods are described for a streamlined presentation feedback on a centralized platform to reduce or eliminate a delay time associated with presentation feedback. The video analysis software application tool may be configured to record a presentation to generate a video recording, analyze the video recording of the presentation based on feedback parameters and an associated neural network model, and automatically provide feedback based on the analysis of the video recording.

19 Claims, 11 Drawing Sheets

| Delivery | Introduction | Body | Conclusion |
|---|---|---|---|
| Vocal Style<br>Vocal Quality<br>Vocal Fillers<br>Eye Contact<br>Body Language | Credibility<br>Attention<br>Central Idea<br>Preview<br>Connective | Support<br>Language<br>Connectives<br>Credibility<br>Organization<br>Adaptation Audience | Signaling Ending<br>Restatement Idea<br>Summary<br>Memorable Ending<br>Credibility |

FIG. 4

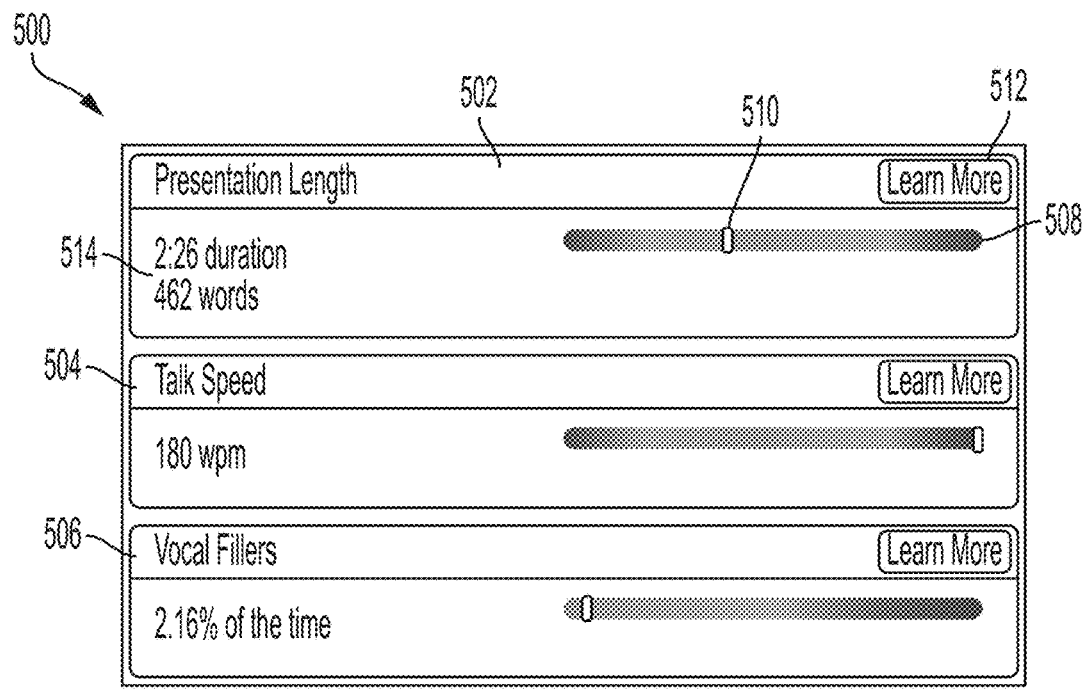

Advisor Section Feedback Messages

| Code | Section Names | Message |
|---|---|---|
| 0 | Introduction | You did a very nice job! Watch your speech video and see your speech from audience's perspective. Is there anything you'd improve on? Did you get your message across? |
| 1 | Delivery | As you practice more, always pay close attention as you begin to ensure you're catching your audience's attention and setting them up for the rest of your speech. |
| 2 | Introduction, Delivery | Your speech was really good! Just work on your delivery a bit. |
| 3 | Body | Nice work! Keep practicing your delivery and starting your speech off strong. |
| 4 | Introduction, Body | Really nice speech! It looks like you need focus the most on improving the body. |
| 5 | Delivery, Body | You had a great delivery and ended strong, just be sure you work on your introduction and the body. |
| 6 | Introduction, Delivery, Body | You began and ended your speech well, but work on your body and your overall delivery. |
| 7 | Conclusion | Nice work, keep up the practice and you'll be ready to confidently delivery your speech in class. |
| 8 | Introduction, Conclusion | Great speech! Just be sure to wrap up strong with a good conclusion. |
| 9 | Delivery, Conclusion | You do a nice job with your message, but be sure you are starting and finishing strong. |
| 10 | Introduction, Delivery, Conclusion | You did an excellent job. Two areas you should focus on are your delivery and conclusion. |
| 11 | Body, Conclusion | Practice makes perfect (or as close as possible)! Keep working to get stronger as a speaker. |
| 12 | Introduction, Body, Conclusion | You started out really strong, be sure to carry that energy through your body and conclusion. |
| 13 | Delivery, Body, Conclusion | Overall, good speech! You had a good delivery but need to work on your content to ensure you're getting your message across. |
| 14 | Introduction, Delivery, Body, Conclusion | That was a good try, you had a nice introduction. Keep practicing! |
| 15 | | Practice is key to becoming a great public speaker. Re-watch your video and consider how you perceive the speech as a listener. |

FIG. 11

| Section | Code | Criteria Names | Message |
|---|---|---|---|
| Introduction | 1 | Connective | Your introduction was spot on! We recommend improving the transition from your introduction to your main points. |
| Introduction | 2 | Credibility | Credibility is the quality of being trusted and being believed. Work to improve your introduction's credibility. Establishing your credibility is key to a good speech. Your introduction should establish why you are knowledgeable of your topic. Be sure to add a strong connective from your introduction to your main points. |
| Introduction | 3 | Connective, Credibility | Don't just begin. For your next practice session, add something that will get your audience's attention. |
| Introduction | 4 | Attention | Always make clear transitions between ideas and points, showing their relationship to one another. |
| Body | 4 | Connectives | |
| Delivery | 4 | VocalFillers | |
| Introduction | 5 | Connective, Attention | While your central idea is spot on, you didn't quite gain our attention from the get go. Work on a stronger attention getter and connective with your first main point. |
| Introduction | 6 | Credibility, Attention | Attention-getters are what draws the audience in and sets the appropriate tone for the speech. Work to improve your attention-getter by clearly establishing your credibility as a speaker. |
| Introduction | 7 | Connective, Credibility, Give your introduction some attention. An introduction helps rope the audience in to the speech. Work on establishing Attention | your credibility, grabbing your audience's attention, and the connection between your thesis and main points. |
| Introduction | 8 | CentralIdea | Your central idea (or thesis statement) could be improved upon. Your central idea should be narrow, defining the intent of your speech in a single declarative sentence. |
| Body | 8 | Credibility | If you have sources, be sure you're clearly stating them out loud to establish the credibility of your message. |
| Delivery | 8 | EyeContact | Be sure you're making eye contact with all audience members, even the far left and right. Avoid looking at notes as much as possible. |
| Introduction | 9 | Connective, CentralIdea | Your introduction is good, but could be better. Your central idea should be more developed. A transition to your main points would also help your audience understand where you are going with your speech. |
| Introduction | 10 | Credibility, CentralIdea | The two most important parts of an introduction are credibility and your central idea. These two aspects should be improved upon to help connect with your audience. |
| Introduction | 11 | Connective, Credibility, CentralIdea | An introduction helps establish your credibility and your thesis. Work to improve your credibility, central idea, and connective to the rest of the speech. |
| Introduction | 12 | Attention | We would recommend you take a look at your introduction. An attention grabbing statement and strong |

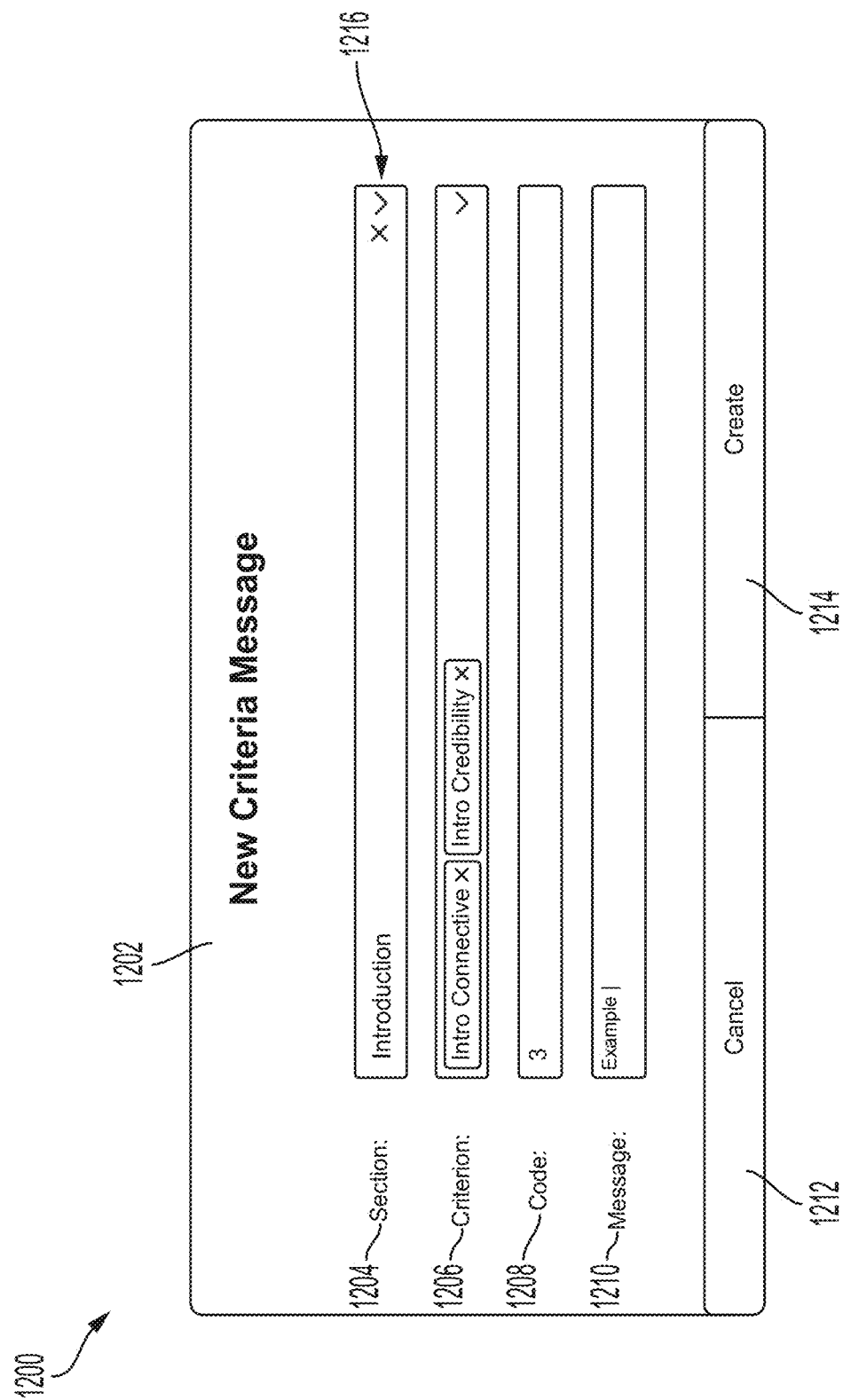

SYSTEMS AND METHODS FOR VIDEO ANALYSIS TOOL FOR COMMUNICATIONS COURSEWORK SCHEDULING AND MANAGEMENT

CROSS-REFERENCE TO RELATED APPLICATIONS

The present disclosure claims priority to U.S. Provisional App. No. 62/855,419, filed May 31, 2019, entitled "SYSTEMS AND METHODS FOR VIDEO ANALYSIS TOOL FOR COMMUNICATIONS COURSEWORK SCHEDULING AND MANAGEMENT," the entirety of which is incorporated by reference herein.

TECHNICAL FIELD

The present disclosure relates to a video analysis tool and, in particular, a video analysis software application tool for a communications coursework scheduling and management on a centralized platform.

BACKGROUND

An individual preparing for a presentation or speech often finds it useful to practice and rehearse the presentation or speech, such as through self-practice, in front of a mirror, on a video camera to later analyze the recording, and/or in front of other individuals. Often, use of such practice mechanisms results in a delayed analysis and/or use of de-centralized sources. Accordingly, a need exists for an alternative analysis tool resulting in an expedited and streamlined analysis.

BRIEF SUMMARY

According to the subject matter of the present disclosure, video analysis software application tool systems and methods are configured to provide automatic feedback on a centralized platform to reduce or eliminate a delay time associated with a verbal presentation feedback. The video analysis software application tool may be configured to record a verbal presentation to generate a video recording, analyze the video recording of the verbal presentation based on feedback parameters, and automatically provide feedback based on the analysis of the video recording.

In an embodiment of the present disclosure, a video analysis system may include a display, one or more processors communicatively coupled to the display, one or more memory components communicatively coupled to the one or more processors, and machine-readable instructions stored in the one or more memory components. The machine-readable instructions may cause the video analysis system to perform at least the following when executed by the one or more processors: receive an input of a digital recording of a presentation, analyze, via a video analysis neural network model, the digital recording of the presentation based on one or more feedback parameters associated with a delivery of the presentation, one or more presentation portions of the presentation, or combinations thereof, generate, via the video analysis neural network model, one or more feedback information, one or more recommendations, or combinations thereof for an overall segment of the presentation, the delivery of the presentation, and each of the one or more presentation portions of the presentation, and display the one or more recommendations and the one or more feedback information on the display.

In another embodiment of the present disclosure, a video analysis system may include a display, one or more processors communicatively coupled to the display, one or more memory components communicatively coupled to the one or more processors, and machine-readable instructions stored in the one or more memory components that cause the video analysis system to perform at least the following when executed by the one or more processors: receive an input of a digital recording of a presenter of a presentation, and generate, via a video analysis neural network model, a body heat map of the presenter of the presentation based on the digital recording of the presentation. The machine-readable instructions may further cause the video analysis system to perform at least the following when executed by the one or more processors: analyze, via the video analysis neural network model, the digital recording of the presentation based on one or more feedback parameters associated with a delivery of the presentation, one or more presentation portions of the presentation, or combinations thereof and the body heat map, generate, via the video analysis neural network model, one or more feedback information, one or more recommendations, or combinations thereof for an overall segment of the presentation, the delivery of the presentation, and each of the one or more presentation portions of the presentation, and display the one or more recommendations and the one or more feedback information on the display. The one or more presentation portions may include an introduction, a body, and a conclusion of the presentation.

In one another embodiment of the present disclosure, a method using a video analysis system including a display to provide automated feedback regarding a presentation may include receiving, via a video analysis system, an input of a digital recording of the presentation, and analyzing, via a video analysis neural network model of the video analysis system, the digital recording of the presentation based on one or more feedback parameters associated with a delivery of the presentation, one or more presentation portions of the presentation, or combinations thereof. The method may further include generating, via the video analysis neural network model, one or more feedback information, one or more recommendations, or combinations thereof for an overall segment of the presentation, the delivery of the presentation, and each of the one or more presentation portions of the presentation, and displaying the one or more recommendations and the one or more feedback information on the display of the video analysis system.

These and additional features provided by the embodiments described herein will be more fully understood in view of the following detailed description, in conjunction with the drawings. Further, although the concepts of the present disclosure are described herein with primary reference to a classroom setting of an educational institute, it is contemplated that the concepts will enjoy applicability to any setting for purposes of delivering a verbal presentation, such as a business setting or otherwise.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4 illustrates example parameters analyzed at different presentation portions of a presentation utilizing the video analysis tool, process, and system of FIGS. 1-3;

FIG. 5 illustrates a display of an analysis of presentation length, speed, and vocal fillers of a presentation utilizing the video analysis tool, process, and system of FIGS. 1-3;

FIG. 10 illustrates a screen setting forth messages for sections used in the one or more artificial intelligence models utilized by the video analysis tool, process, and system of FIGS. 1-3 to provide with the feedback given in the overall area of recommendations of FIG. 7;

FIG. 11 illustrates a screen setting forth messages for sections used in the one or more artificial intelligence models utilized by the video analysis tool, process, and system of FIGS. 1-3 to provide with the feedback given for the presentation portions of introduction, body, conclusion and delivery as associated recommendations in the presentation portion recommendations of FIG. 7; and FIG. 12 illustrates a display of an example new criteria message entry to create feedback based on a criteria to be improved within a certain presentation portion, according to one or more embodiments shown and described herein.

DETAILED DESCRIPTION

In embodiments described herein, a video analysis software application tool for a streamlined analysis of a verbal presentation on a centralized platform aids to reduce or eliminate a delay time associated with presentation feedback. The presentation application tool may additionally be configured for user access through user login through one or more user devices such that the user may create, build, and practice the presentation with use of the presentation application tool, as described in greater detail below.

Figure 1:
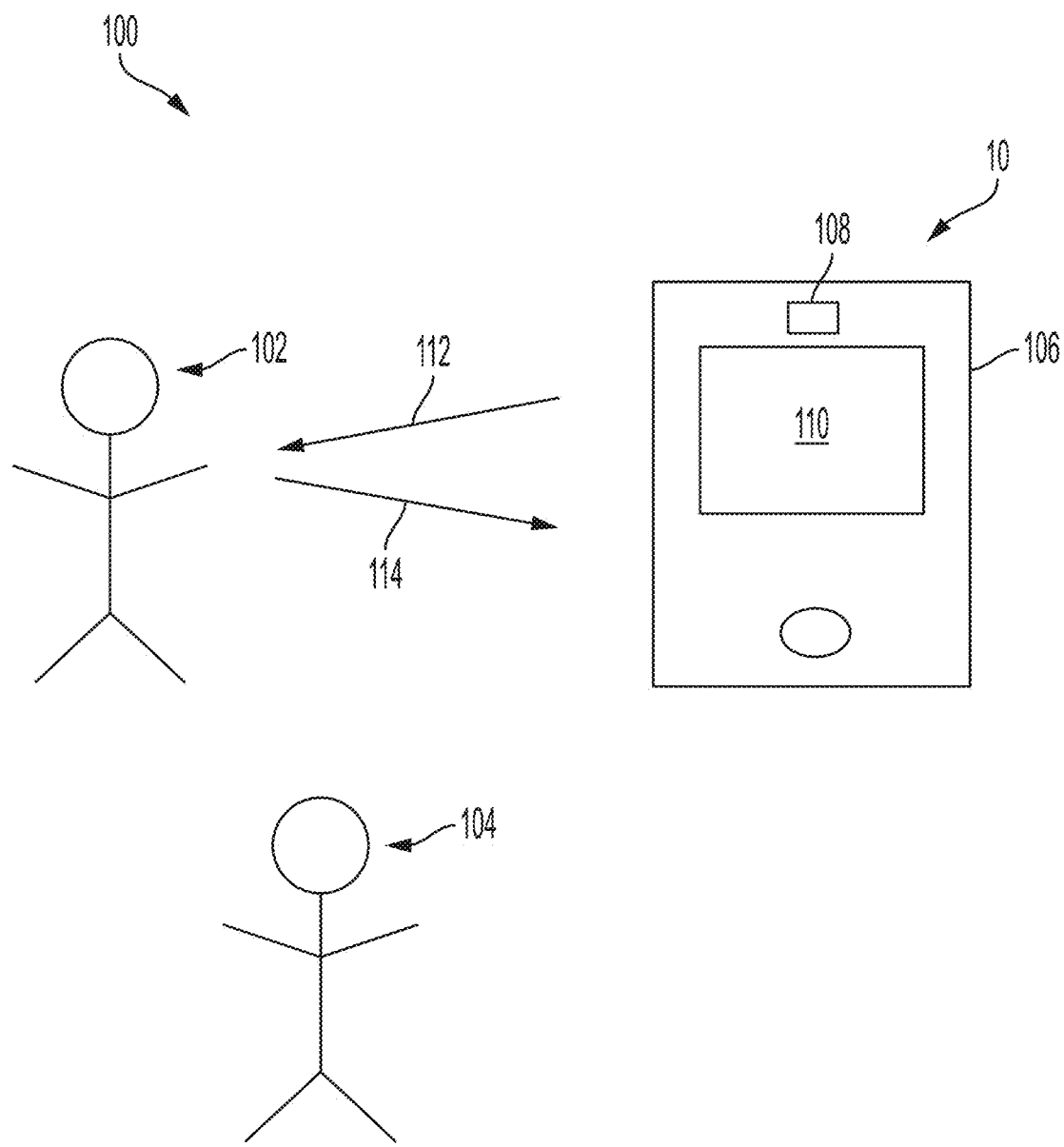
FIG. 1 illustrates a verbal presentation delivery setting utilizing a video analysis tool, according to one or more embodiments shown and described herein.

Referring initially to FIG. 1, a video analysis tool 10 (e.g., a video analysis software application tool) is shown, which is embodied in a system 300 including a feedback parameter module 312 and a feedback generation module 316, which system 300 is described in greater detail below. The video analysis tool 10 is communicatively coupled to a computing device 106 that includes recording device 108 and a graphical user interface (GUI) display 110. In embodiments, the video analysis tool 10 may be a web-based application tool accessible on a GUI of a computing device 324 (FIG. 3), described in greater detail below. It is contemplated and within the scope of this disclosure that the computing device 106, 324 may be a personal computer, a web-cam, a laptop device, a smart mobile device such as a smart phone, smart tablet, or smart pad, or another suitable computational electronic device. As described herein, use of "smart" with respect to a device or item, such as a mobile device or vehicle or vehicle feature, is in reference to electronic devices or items that are configured to be in electronic communication with one or more other technologies through a wired or wireless communication link, which may include and be employed through an Internet of Things communication network. By way of example, and not as a limitation, such a wired or wireless communication link may include a communication network as described herein, a communication path as described herein, conductors to electronically connect a pair of devices, and/or other conventional or yet-to-be developed technologies, or combinations thereof, as understood to those skilled in the art, to provide the communication link.

The video analysis tool 10 may be used to record 112 a presentation 114 of and presented by an individual 102 in a setting 100. The setting 100 may be, for example, a classroom setting in which another individual 104 such as an instructor is present. In embodiments, the individual 102 may be a student presenting the presentation 114 as a verbal presentation, performance presentation, or combinations thereof for a grade by the instructor as the individual 104 when the setting 100 is the classroom setting.

Figure 2:
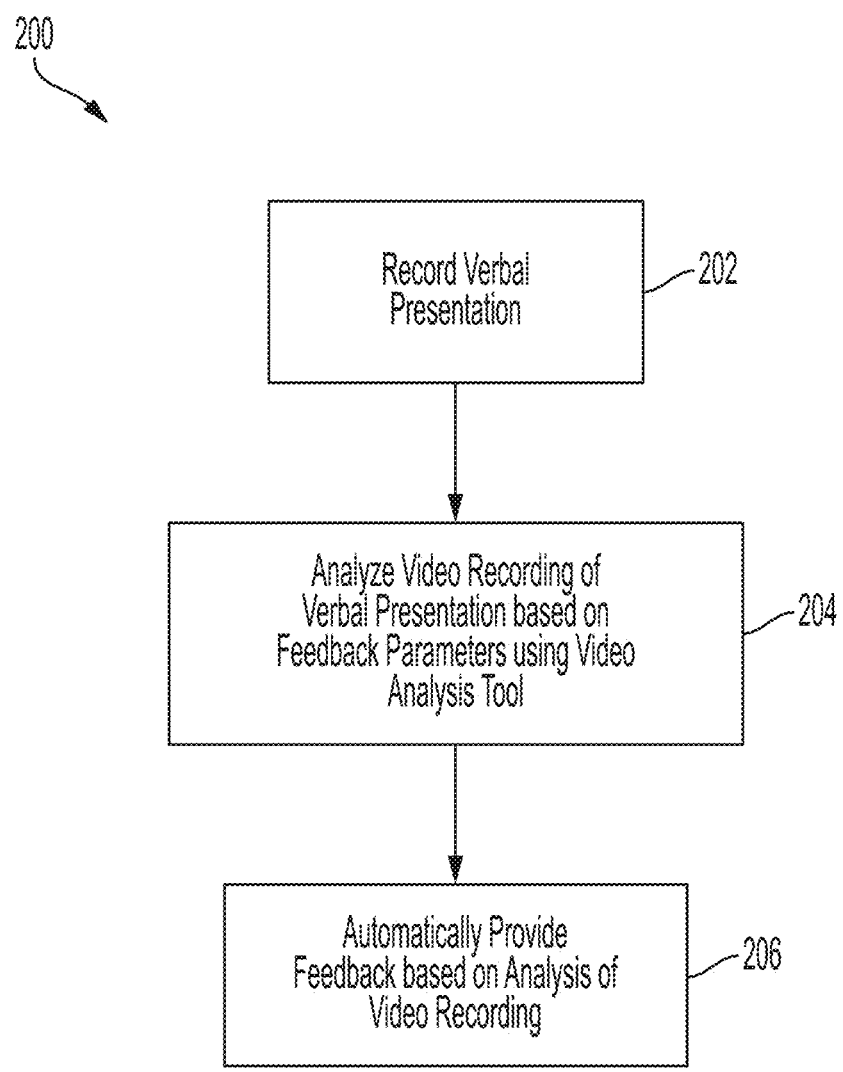
FIG. 2 illustrates a flowchart process for use of the video analysis tool of FIG. 1.

FIG. 2 illustrates an embodiment of a process 200 for use of the video analysis tool 10 of FIG. 1. In block 202, the presentation 114 of the individual 102 (FIG. 1) is recorded utilizing a recording device 108 communicatively coupled to the video analysis tool 10. As a non-limiting example, the recording device 108 as an audio-visual camera is used of the computing device 106 is used to record 112 the presentation 114 of the individual 102 in the setting 100.

In block 204, the video recording of the verbal presentation 114 is analyzed by the video analysis tool based on one or more feedback parameters. In embodiments, the one or more feedback parameters may be based on visual, audio, and/or verbal feedback components. By way of example, and not as a limitation, visual feedback components may include, but are not limited to, eye contact, body language, timestamp feedback, change-based feedback, scoring rubric based feedback, and review-based feedback. Embodiments of feedback parameters for portions of the presentation 114 as well as overall for the presentation 114 are described in greater detail further below with respect to FIG. 4.

In some embodiments, whether with respect to one or more portions of the presentation 114, the overall presentation 114, or combinations thereof, such feedback parameters may be analyze to provide recommendations via the video analysis tool 10 as described herein. As a non-limiting example, eye contact feedback parameters may involve determinations through video analysis of whether the head of the individual 102 is positioned up or down with respect to horizontal, whether the individual 102 is looking at a whole or a part of an audience in the setting 100 and for what lengths of time, how quickly the focus of the individual 102 changes, and the like. Body language feedback parameters may involve determination of whether the individual 102 is swaying, walking around, generating hand motions, pivoting from leg to leg, "talking" with hands through expressive hand gesturing, and the like. Timestamp feedback parameters may include feedback based on specific moments in time within the video recording to show exactly what the feedback is related to and what prompted it, such as moments at which a certain gesture or word was used or moments at which the focus of the individual 102 shifted with respect to the audience.

Change-based feedback parameters may include generation of a report of an improvement and/or change over time with respect to the one or more feedback parameters across a plurality of video recordings of the presentation 114 of the individual 102. Scoring rubric based feedback parameters may include using a pre-generated and inputted scoring rubric and/or guidelines to analyze and grade various aspects of the presentation 114. Review-based feedback parameters may include providing instructors with an ability to review the video recording of the presentation 114 and use the review as a guide and/or to cross-reference their own feedback notes to provide additional guidance and suggestions to the individual 102 to improve the presentation 114 for future recordings or presentation.

Further by way of example, and not as a limitation, audio and/or speech feedback components may be analyzed and provided as described in greater detail below with respect to FIGS. 5-12. Such audio and/or speech feedback components associated with analysis of the presentation 114 by the video analysis tool 10 may include, but are not limited to, talk speed, vocal quality, vocal fillers, conclusion signaling, conclusion summarization, planning, and, as set forth above, timestamp feedback, change-based feedback, scoring rubric based feedback, and review-based feedback.

Talk speed feedback parameters may include determination of the speed of speech of the individual 102 giving the presentation 114 as a verbal presentation, such as fast or slow, as well as consistence of speech speed and/or effective use of pauses. Vocal quality feedback parameters may include determination of an amount of variety in vocal quality, the volume of the individual 102, and/or the clarity of the verbal presentation such as whether the individual 102 mumbled, blurred words, or mispronounced words during the verbal presentation. Vocal fillers feedback parameters may include the amount of times pre-identified vocal fillers are used during the verbal presentation, such as "uhm," "you know," "uh," "I mean," "so," and the like.

Conclusion signaling feedback parameters may include determination of whether the individual 102 providing a pre-identified phrase signaling a conclusion such as "in conclusion," "in closing," "finally," "to wrap up," or the like. Conclusion summarization feedback parameters may include determination of whether the individual 102 summarized main points in the conclusion and/or whether the conclusion was memorable and powerful such as through restatements of a central idea or presented topics. The planning feedback parameters may include determination of how well the individual 102 internalized or made points from a presentation outline, such as an incorporation of 76% of the points from the presentation outline leading to a feedback along the lines of "practice the verbal presentation more to achieve a higher or highest percentage of incorporation of outline points."

In block 206, the video analysis tool 10 is configured to automatically provide feedback based on the analysis of the presentation 114 utilizing the one or more feedback parameters. Such feedback may be based off the expert and/or objective feedback from the one or more feedback parameters as set forth above based on, and not limited to, the words that are being presented and spoken, how the words are being presented and spoken, the quality of the verbal presentation, the vocal quality of the individual 102 presenting the presentation 114, and other aspects that a communication instructor, for example, would provide as feedback to improve the verbal presentation, such as in a communication classroom setting. Weights utilized for one or more artificial intelligence models employed by the video analysis tool 10 are described in greater detail below with respect to FIGS. 8-12. Such artificial intelligence models may include machine learning models, as described in greater detail further below.

In embodiments, the video analysis tool 10 is configured to permit the individual 102 or another individual 104 to record the verbal presentation and provide automatic analysis and feedback to the individual 102 on how to improve the verbal presentation. The video recording may be uploaded into a software model of the video analysis tool 10 or be recorded and received directly by the software model utilizing a camera from a computing device 106, 324 on which the video analysis tool 10 is disposed as a software application (e.g., software "app"). After the video analysis tool 10 analyzes the video record, the video analysis tool 10 may be configured to present a user with feedback about the analyzed verbal presentation based on set criteria and best practices as described herein.

In a classroom setting, the instructor may be able to access practice recordings of a student as well as in-class recorded verbal presentations from the video analysis tool 10 to provide the student with additional feedback and to comment on and determine what trends may exist across the plurality of analyzed recordings and previous feedback. For example, a student may be prone to utilizing vocal fillers, and the instructor can determine whether the student is improving when practicing with respect to reducing an amount of times vocal fillers are being used during the verbal presentation. In embodiments, the video analysis tool 10 may be used as an educational tool for teachers, instructors, and/or students in a classroom setting and for an users to improve presentation speaking ability and quality with respect to verbal presentations such as speeches.

As non-limiting embodiments, the video analysis tool 10 may be configured to utilize artificial intelligence or machine learning technologies to provide feedback to a user about a recording of a verbal presentation as described herein. The feedback may be based on, for example, an inputted and stored scoring rubric and guidelines setting forth set criteria and best practices. The video analysis tool 10 may be configured to provide the user and/or instructor with a summary overview of a practice session of the recorded verbal presentation and offer an opportunity for the user and/or instructor to comment, contribute, modify, and/or expand upon the automatic feedback provided by the video analysis tool 10.

The video analysis tool 10 may be configured to, through use of such artificial intelligence or machine learning technologies, analyze one or more visual aspects of the recorded verbal presentation without requiring external and/or supplemental hardware such as wearable sensor devices. The one or more models employed by the video analysis tool 10 may include artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The video analysis tool 10 may utilize one or more ANN models as understood to those skilled in the art or as yet-to-be-developed to provide feedback associated with the presentation 114 as described in embodiments herein.

The video analysis tool 10 may utilize one or more ANN models configured to slice the recorded video into extracted audio and images which are input into the ANNs for further processing based on activation parameters and associated weights and biases in the one or more activation layers as set per the trained models or adjusted through machine learning. The video analysis tool 10 utilizes the one or more ANN models that may improve through new input training set data over time, whether through manual input new training data sets or automatically input training data sets through machine learning as described herein generated from previous ANN model outputs. As more utilized data (e.g., training data) extends capabilities of the video analysis tool 10, more accurate analytic outputs, such as with respect to text analysis and/or deep vocal analysis, may be generated components of the one or more ANNs of the video analysis tool 10. The video analysis tool 10 utilizes the one or more ANN models to grade the input extracted data and determine correlations with behavior of the presenter as the individual 102 and an outcome of the grading criteria as determined and generated by the one or more ANN models.

As set forth herein, such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models used by the video analysis tool 10 and system 300 may employ a combination of artificial intelligence techniques, such as, but not limited to, Deep Learning, Random Forest Classifiers, Feature extraction from audio, images, clustering algorithms, or combinations thereof. Through a combination of such techniques, the video analysis tool 10 is configured to generate an automatic evaluation of human speech associated with a presentation 114 as described herein, for example. The video analysis tool 10 may further be configured to analyze data such as speech and movements in the presentation 114 to generate results to which clustering is applied to further generate correlations and/or similarity between such analyzed data.

For example, a convolutional neural network (CNN) may be used as an ANN that, in a field of machine learning, for example, is a class of deep, feed-forward ANNs applied for audio-visual analysis of the recorded verbal presentation. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

The video analysis tool 10 may further pair video and audio analysis of the recorded verbal presentation to generate the automatic feedback of the recorded verbal presentation via such ANN models as described herein. The video analysis tool 10 may further automatically compare the recorded verbal presentation of the individual 102 with previous recordings of the individual 102, whether of the same or different verbal presentations, to generate a report on trends or other useful automated feedback with respect to the individual 102. A user who desires to practice the verbal presentation may utilize the video analysis tool 10 as often as desired to generate feedback while feedback from another individual 104 may be limited to one or a few number of times. An instructor may be permitted through the video analysis tool 10 to review the automated feedback such that the instructor may score the verbal presentation in a classroom setting more rapidly than reviewing the entire recording themselves to manually generate feedback. This allows the instructor to more quickly grade verbal presentations, which can effect an increase in class sizes and a reduction in instructor workload. Further, the video analysis tool 10 may allow for an autonomous communication course with eliminated or minimal instructor oversight. In embodiments, the setting 100 may be a virtual classroom setting in which the individual 104 as the instructor may review and grade the presentation 114 of the individual 102 who may be the student.

Figure 3:
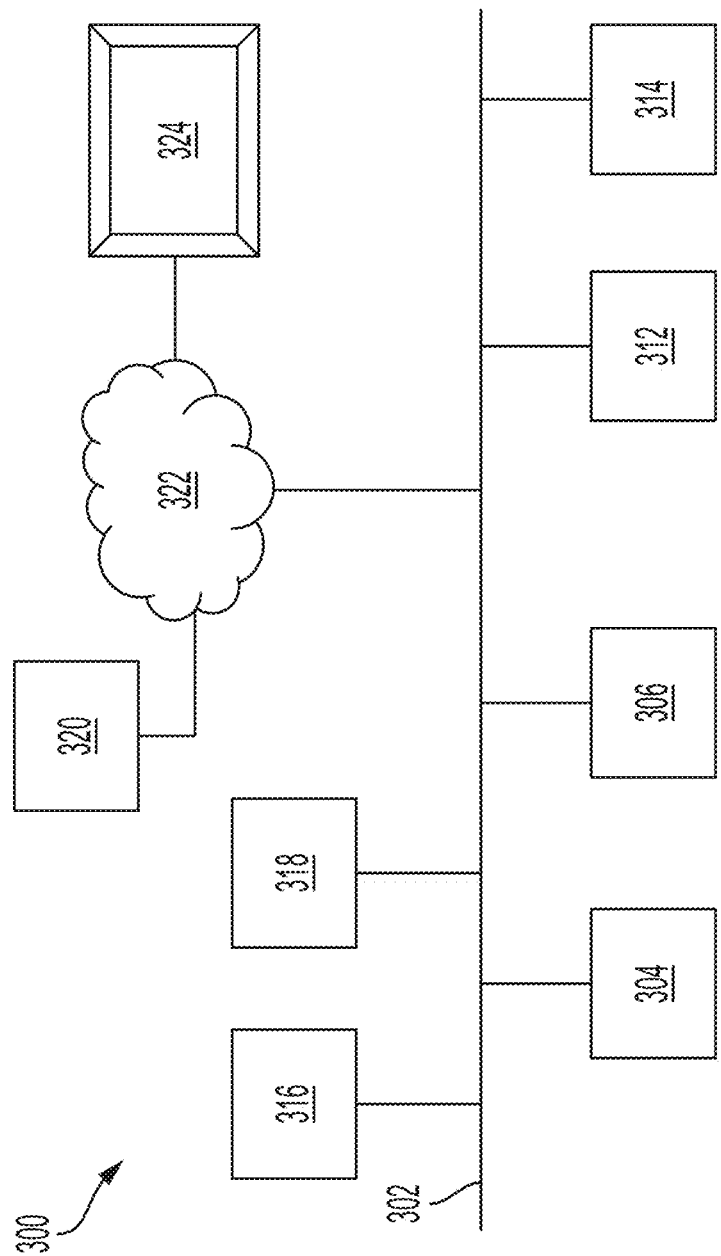
FIG. 3 illustrates a computer implemented system for use with the process flow of FIG. 2, according to one or more embodiments shown and described herein.

FIG. 3 illustrates a computer implemented system 300 for use with the process 200 of FIG. 2. Referring to FIG. 3, a non-transitory system 300 for implementing a computer and software-based method to utilize system presentation application tools for preparing and presentation a select presentation as described herein is illustrated as being implemented along with using a graphical user interface (GUI) that is accessible at a user workstation (e.g., a computing device 324), for example. The system 300 comprises a communication path 302, one or more processors 304, a non-transitory memory component 306, a feedback parameter module 312 of the video analysis tool 10, database 314, a feedback generation module 316 of the video analysis tool 10, a network interface hardware 318, a network 322, a server 320, and the computing device 324. The various components of the system 300 and the interaction thereof will be described in detail below.

While only one application server 320 and one user workstation computing device 324 is illustrated, the system 300 can comprise multiple application servers containing one or more applications and workstations. In some embodiments, the system 300 is implemented using a wide area network (WAN) or network 322, such as an intranet or the Internet. The workstation computing device 324 may include digital systems and other devices permitting connection to and navigation of the network. Other system 300 variations allowing for communication between various geographically diverse components are possible. The lines depicted in FIG. 3 indicate communication rather than physical connections between the various components.

The system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The system 300 of FIG. 3 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, as noted above, the system 300 comprises the display such as a GUI on a screen of the computing device 324 for providing visual output such as, for example, information, the screens described herein (e.g., FIG. 1), graphical reports, messages, or a combination thereof. The display on the screen of the computing device 324 is coupled to the communication path 302 and communicatively coupled to the processor 304. Accordingly, the communication path 302 communicatively couples the display to other modules of the system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the system 300 is illustrated as a single, integrated system in FIG. 3, in other embodiments, the systems can be independent systems.

The system 300 comprises the feedback parameter module 312 as described above to store and provide one or more parameters to utilize to provide feedback and the feedback generation module 316 for providing feedback via the video analysis tool 10 of a verbal presentation based on the one or more parameters of the feedback parameter module 312. The feedback generation module 316 may include an artificial intelligence component to train and provide machine learning capabilities to a neural network as described herein. The feedback parameter module 312 and the feedback generation module 316 are coupled to the communication path 302 and communicatively coupled to the processor 304. As will be described in further detail below, the processor 304 may process the input signals received from the system modules and/or extract information from such signals.

Data stored and manipulated in the system 300 as described herein is utilized by the feedback generation module 316, which is able to leverage a cloud computing-based network configuration such as the cloud to apply one or more artificial intelligence technologies, which may include machine learning technologies. Such an application of one or more artificial intelligence technologies may utilize one or more intelligent models that can be applied by the system 300. The system 300 may generate an optimized solution of the recommendations to provide based on an automated analysis of the presentation 114 utilizing input parameters and the one or more intelligent models. Further, such an application of one or more artificial intelligence technologies including machine learning technologies may improve models that can be applied by the system 300, to make the system 300 more efficient and intelligent in execution. As an example and not a limitation, the feedback generation module 316 may include artificial intelligence components selected from the group that may include, but not be limited to, an artificial intelligence engine, Bayesian inference engine, and a decision-making engine, and may have an adaptive learning engine further comprising a deep neural network learning engine.

The system 300 comprises the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 3, data from various applications running on computing device 324 can be provided from the computing device 324 to the system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the Internet, an Intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

FIGS. 4-12 are directed to utilization of the video analysis tool 10, process 200, and system 300 of FIGS. 1-3. As a non-limiting example, FIG. 4 shows a plurality of parameters 400 analyzed and for analysis at different presentation portions of a presentation 114. The presentation portions may include a delivery 402, an introduction 404, a body 406, and a conclusion 408 of a presentation 114. The plurality of parameters 400 to analyze for the delivery 402 of the presentation 114 may include vocal style, vocal quality, vocal filters, eye contact, and/or body language. The plurality of parameters 400 to analyze for the delivery 402 may be applied to an analysis of one or more portions of the presentation 114 and/or an overall analysis of the presentation 114. As a non-limiting example, the one or more portions of the presentation 114 may include the introduction 404, the body 406, and the conclusion 408.

The plurality of parameters 400 to analyze for the introduction 404 of the presentation 114 may include credibility, attention, central idea, preview, and/or connective. A parameter analysis of credibility may be directed to how credible the introduction 404 as presented is to an audience of the presentation 114. A parameter analysis of attention may be directed to how well the individual 102 mains the attention of the audience. A parameter analysis of central idea may be directed to how well the individual 102 conveys a central idea of the presentation 114 in the introduction 404. A parameter analysis of preview may be directed to how well the individual 102 sets up an agenda format of the presentation 114 in the introduction 404. A parameter analysis of connective may be directed to how well the individual 102 connects with the audience in the introduction 404.

The plurality of parameters 400 to analyze for the body 406 of the presentation 114 may include support, language, connectives, credibility, organization, and/or adaptive audience. A parameter analysis of support may be directed to how well the individual 102 provides support for a thesis and points made in the body 406. A parameter analysis of language may be directed to proper grammatical structure utilized by the individual 102 in the body 406. A parameter analysis of credibility may be directed to how credible the body 406 as presented is to the audience of the presentation 114. A parameter analysis of connectives may be directed to how well the individual 102 connects with the audience and/or relays one or more points during the body 406 presented to the audience. A parameter analysis of organization may be directed to how organized the body 406 is in comparison to an outline or agenda format. A parameter analysis of adaptive audience be may directed to how well the body 406 may be presented to different audiences or the flexibility of change of the body 406 depending on the audience.

The plurality of parameters 400 to analyze for the conclusion 408 of the presentation may include signaling ending, restatement idea, summary, memorable ending, and/or credibility. A parameter analysis of signaling ending may be directed to how well the presenter signals an ending of the presentation 114 in the conclusion 408. In embodiments, certain words and/or phrases may be analyzed and applied for such a feedback metric by the video analysis tool 10 such as "in conclusion." A parameter analysis of restatement idea may be directed to how well the presenter restates the main idea, such as a thesis, of the presentation 114 in the conclusion 408. A parameter analysis of summary may be directed to how well the presenter summarizes the main points of the presentation 114 in the conclusion 408. A parameter analysis of memorable ending may be directed to how well the presenter finalizes the presentation 114 in the conclusion 408. A parameter analysis of credibility may be how credible the presenter is to the audience in the conclusion 408 of the presentation 114.

It is contemplated and within the scope of this disclosure that fewer or more parameters 400 may be utilized for analysis of portions of a presentation 114 and/or an overall analysis of the presentation 114 by the video analysis tool 10 as described herein. The parameters analyses of the plurality of parameters 400 as described herein may be based on artificial intelligence models trained on data sets, such as previously graded and/or analyzed presentations and/or rubric grading structures, which provide analysis determinations for each of the parameter 400. Embodiments of other parameters 400 may include a listing of actual vocal fillers used, a visual of eye contact, criteria based on instructor rubrics, different course parameters (such as a sales-oriented course or a foreign language course, performing arts, counseling, and/or other video recordable course or presentation type), sign language analysis parameters, accuracy of pronunciation, or combinations thereof.

FIG. 5 shows a display 500 of an analysis of speech metrics such as presentation length 502, talk speed 504, and vocal fillers 506 of a presentation 114 utilizing the video analysis tool 10, process 200, and system 300 of FIGS. 1-3. The display 500 may be generated and displayed as a screen view or part of another screen view via the GUI display 110 of the video analysis tool 10 and/or through a display of any other computing device 324 communicatively coupled to the video analysis tool 10. The display 500 includes a scale 508 and marker 510 configured to be disposed at a point along the scale 508 to represent a level of the analyzed performance of the individual 102 of the presentation 114 for each of presentation length 502, talk speed 504, and vocal fillers 506. In embodiments, the scale 508 may be color-coded from, for example, a lighter shade at a left end to a darker shade at the right end, or vice versa. Each of the presentation length 502, talk speed 504, and vocal fillers 506 sections may include a learn more button 512 configured to direct a user to learn more about the feedback provided for each section, such as a further breakdown of more detailed analysis associated with the respective feedback and/or recommendations of different materials to review to improve performance based on such feedback and/or gain more subject matter knowledge based on such feedback.

In embodiments, the speech metrics may provide quantitative descriptors of the presentation 114, such as number of words, total presentation time, speaking rate, and/or a vocal fillers percentage directed to total fillers determined divided by total words determined. Presentation length may be measured against minimum and maximum time parameters that are entered by a user. Word count and talk speed may be determined based on a speech to text conversion and providing an exact count of words and words divided by time in minutes to determine words per minute (wpm). Vocal fillers such as "um," "so," "ya know," and the like may be identified through the speech to text conversion and analyzed with respect to frequency and placement of the fillers compared to other words in sentences. The video analysis tool 10 may be configured to return an overall frequency as a percentage of time that vocal fillers are determined to be used during a presentation 114.

As shown in FIG. 5, the presentation length 502 section positions the marker 510 near the middle-left of the scale 508 to indicate a shorter presentation as the presentation 114 and provides feedback information 514 such as a presentation length of 2:26 (e.g., 2 minutes and 26 seconds) with a total of 462 words spoken. The talk speed 504 section positions the marker 510 near the right end of the associated scale 508 to indicate a rapid talk speed along with associated feedback information 514 of 180 words per minute (wpm). The vocal fillers 506 section positions the marker 510 nears a left end of the associated scale 508 to indicate minimal use of vocal fillers (such as "um," "uh," and similar filler utterances) and provides associated feedback information 514 of vocal fillers being used by the individual 102 2.16% of the time of the presentation 114.

Figure 6:
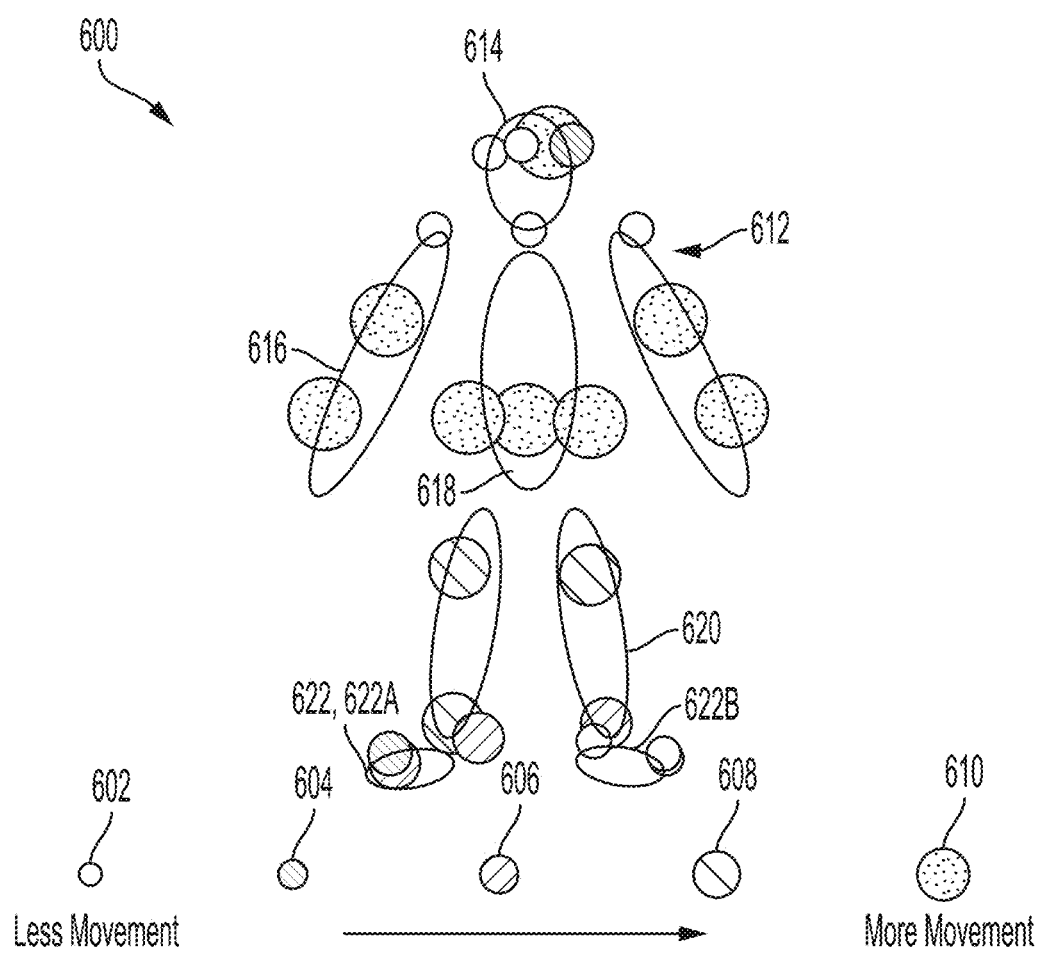
FIG. 6 illustrates a body heat map of a presenter of a presentation generated and displayed utilizing the video analysis tool, process, and system of FIGS. 1-3.

FIG. 6 shows a body heat map 600 of a presenter such as the individual 102 of a presentation 114 generated and displayed via the GUI display 110 of the video analysis tool 10 and/or through a display of any other computing device 324 communicatively coupled to the video analysis tool 10. The body heat map 600 tracks movement between less movement to more movement of a body 612 of the individual 102 during the presentation 114 through nodes 602, 604, 606, 608, and 610. The nodes 602, 604, 606, 608, and 610 may respectively increase in size and employ different patterns and/or colors to reflect a corresponding movement from the less movement node 602 to the more movement node 610. The body heat map 600 includes body portions of the body 612 of the individual 102 such as a head portion 614, arm portions 616, torso portion 618, leg portions 620, and feet portions 622. The body portions may be divided between right and left sides A, B of the body 612 facing towards a viewer. For example, a right foot may be shown as foot portion 622A and a left foot may be shown as foot portion 622B.

The body heat map 600 may be configured to display multiple properties representative of joints of a pose (e.g., position and orientation) of an individual during the presentation 114 and a magnitude of each movement of those joints during the presentation 114. Areas of focus of the body 612 of the body heat map 600 may include one or more of Nose, Neck, Right Shoulder, Right Elbow, Right Wrist, Left Shoulder, Left Elbow, Left Wrist, Mid Hip, Right, Hip, Right Knee, Right Ankle, Left Hip, Left Knee, Left Ankle, Right Eye, Right Ear, Left Ear, Left Small Toe, Left Heel, Right Big Toe, Right Small Toe, and/or Right Heel. The body heat map 600 may be used to employ a pose estimation of the individual 102 during the presentation 114 to analyze body movement of the individual 102 throughout the presentation 114.

The nodes 602, 604, 606, 608, and 610 may be positioned on different areas of the body portions of the body 612 to represent amount of movement of those body portions of the individual 102 during the presentation. By way of example, and not as a limitation, the body heat map 600 indicatives the individual 102 during the presentation 114 had more movements in lower regions of the arm portions 616 and torso portion 618, less movement in shoulder regions of the arm portions 616, less movement around a neck area of the head portion 614, more movement around an eye area of the head portion 614, and more movement in the leg portions 620 compared to the feet portions 622. Further, the right foot portion 622A appears to have moved more than the left foot portion 622B, which may have been the result of, for example, more tapping of the right foot portion 622.

Figure 7:
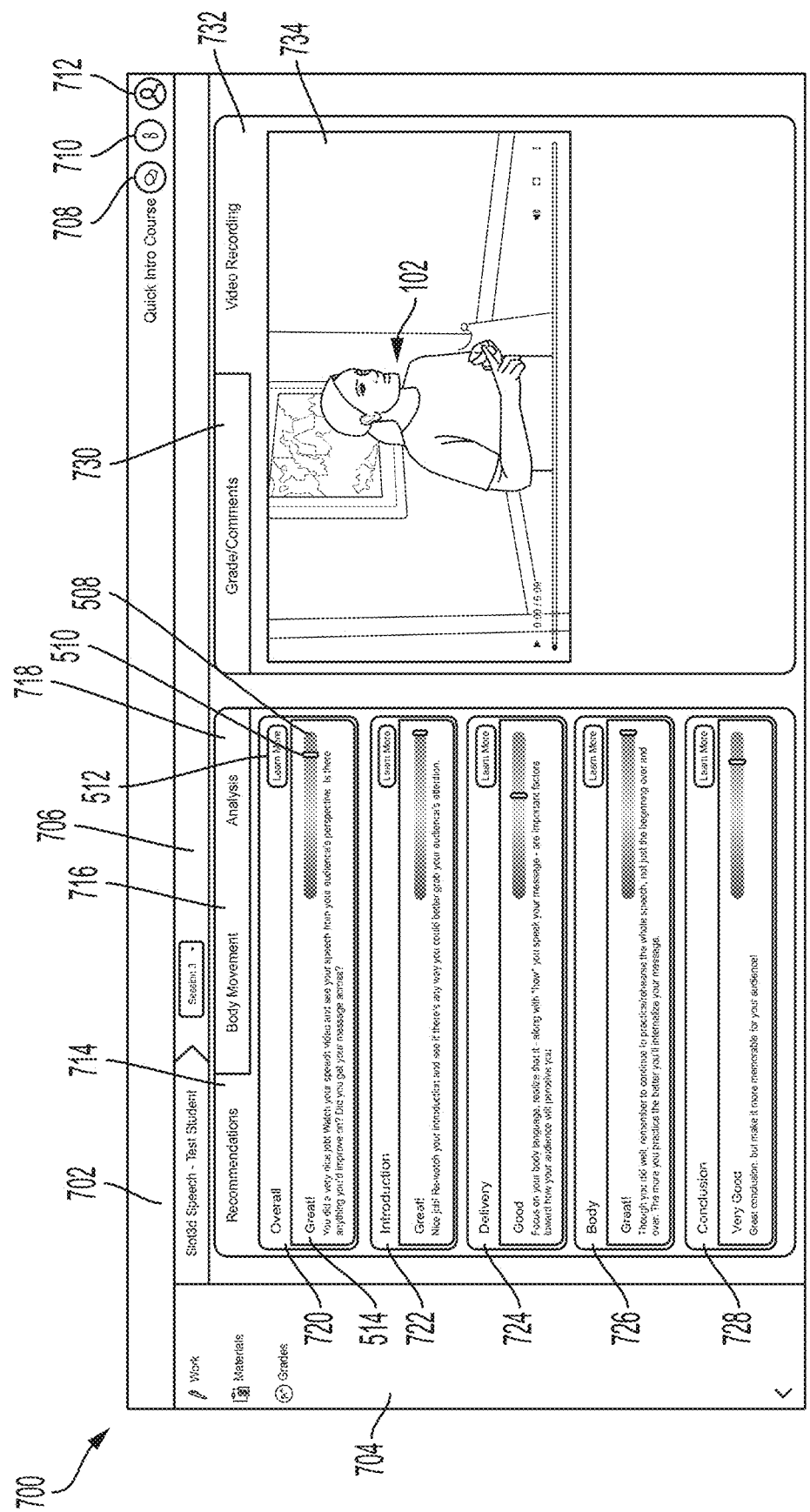
FIG. 7 illustrates a screen view display of an overall area of recommendations and presentation portion recommendations for a presenter of a presentation generated utilizing the video analysis tool, process, and system of FIGS. 1-3.

FIG. 7 shows a screen view display 700 including a top display bar 702, a side display 704, and a middle area screen 706 to provide analysis for an individual 102 presenting a presentation 114 utilizing the video analysis tool 10, process 200, and system 300 of FIGS. 1-3. The middle area screen 706 may include a recommendations tab 714, a body movement tab 716, an analysis tab 718, a grade/comments tab 730, and a video recording tab 732.

The recommendations tab 714 may include an overall area of recommendations as overall recommendations area 720 and presentation portion recommendations including introduction recommendations area 722, delivery recommendations area 724, body recommendations area 726, and conclusions recommendations area 728 for the individual 102 presenting the presentation 114. The video analysis tool 10 may be configured to provide feedback through the screen view display 700 based on the categories of overall speech, delivery, introduction, body, and conclusion with respect to the presentation 114 and as described herein. Recommendations may be based on a combination of criteria analyzed, and the video analysis tool 10 may be configured to determine and prioritize areas to improve based on criteria analyzed and provide recommendations associated with such prioritized areas for improvement. Feedback may be provided in different forms, such as a general rating feedback (e.g., providing an indication of Needs Improvement, Fair, Good, Very Good, or Great!), visual feedback (such as through the scale 508 of FIG. 5 described herein), and/or a text recommendation feedback in the form of a message providing a recommendation as shown in FIG. 7.

The screen view display 700 may be generated and displayed via the GUI display 110 of the video analysis tool 10 and/or through a display of any other computing device 324 communicatively coupled to the video analysis tool 10. The screen view display 700 may include other tabs such as a body movement tab 716 and an analysis tab 718. For instance, the body movement tab 716 may be configured to display the body heat map 600 of FIG. 6.

Each of the overall recommendations area 720, the introduction recommendations area 722, the delivery recommendations area 724, the body recommendations 726, and the conclusions recommendations 728 may include an associated scale 508 with marker 510, learn more button 512, and associated feedback information 514 that may be provided based on feedback messages generated by artificial intelligence models of the video analysis tool 10 as described herein. By way of example, and not a limitation, the plurality of parameters 400 used for the analysis in the introduction recommendations area 722, the delivery recommendations area 724, the body recommendations 726, and the conclusions recommendations 728 sections may respectively be the plurality of parameters 400 set forth for the introduction 404, the delivery 402, the body 406, and the conclusion 408 of the presentation 114 in FIG. 4.

In the embodiment shown in FIG. 7, the feedback for the individual 102 is generally positive. The overall recommendations area 720 includes associated feedback information 514 of "Great!" The associated feedback information 514 includes an associated feedback message of "You did a very nice job! Watch your speech video and see your speech from your audience's perspective. Is there anything you'd improve on? Did you get your message across?" The marker 510 is disposed near a high, positive end of the scale 508.

The introduction recommendations area 722 includes associated feedback information 514 of "Great!" The associated feedback information 514 includes an associated feedback message of "Nice job! Re-watch your introduction and see if there's any way you could better grab your audience's attention." The marker 510 is disposed at a high, positive end of the scale 508.

The delivery recommendations area 724 includes associated feedback information 514 of "Good" and associated feedback information 514 includes an associated feedback message of "Focus on your body language, realize that it—along with "how" you speak your message—are important factors toward how your audience will perceive you." The marker 510 is disposed toward a middle-right, more positive end of the scale 508.

The body recommendations area 726 includes associated feedback information 514 of "Great!" The associated feedback information 514 includes an associated feedback message of "Though you did well, remember to continue to practice/rehearse the whole speech, not just the beginning over and over. The more you practice the better you'll internalize your message." The marker 510 is disposed at a high, positive end of the scale 508.

The conclusions recommendations area 728 includes associated feedback information 514 of "Very Good" and the associated feedback information 514 includes an associated feedback message of "Great conclusion, but make it more memorable for your audience!" The marker 510 is disposed toward a high, positive end of the scale 508, which is indicative of a good conclusion with room for improvement.

The screen view display 700 may include the top display bar 702 in which user selection features such as navigation buttons 708, 710, 712 may be displayed. For example, the navigation button 708 of the top display bar 702 may be a button to start a chat feature, the navigation button 710 may be a button to access a different tool page or switch users or employ a different function, and the navigation button 712 may be a button to access a user profile of the video analysis tool 10.

The screen view display 700 may also include the side display bar 704 in which a menu of access options may be listed, such as links to work materials, other materials such as presentation materials, and grades data (e.g., the grades associated for a class for an instructor account or the tracked grades associated with a particular individual 102 as a student for a student account).

The screen view display 700 may include the grades/comments tab 730 to display a grade/comments for the individual 102 as the presenter of the presentation 114. The screen view display 700 may further include the video recording tab 732 including an audio-visual screen 734 configured to display the presentation 114 of the individual 102. By way of example, and not as a limitation, use of the video analysis tool 10 to determine an individual 102 who gave a presentation 114 needs to improve eye contact and vocal fillers may cause the system 300 to determine the individual needs to gain more confidence and to generate a message to the individual 102 with a recommendation to practice more, from which such confidence may be gained. Such messages with recommendations associated with analyzed parameters/criterion, as displayed in the screen view display 700, may be created and generated within the video analysis tool 10 through use of the one or more artificial intelligence models and as shown in FIGS. 8-12 described below.

Figure 8:
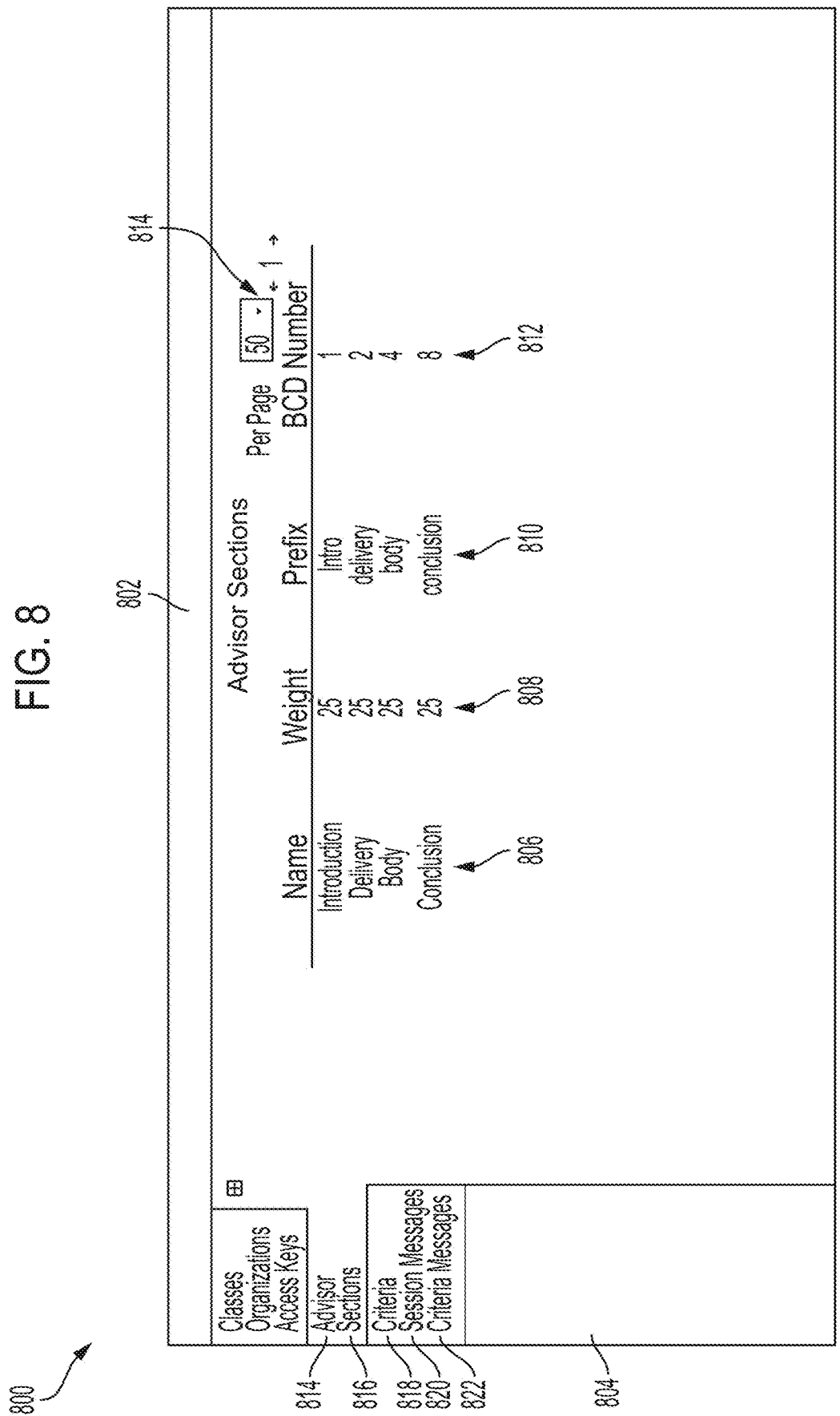
FIG. 8 illustrates a screen setting forth weights of sections used in one or more artificial intelligence models utilized by the video analysis tool, process, and system of FIGS. 1-3 to determine feedback given in the overall area of recommendations of FIG. 7.

FIG. 8 shows a screen 800 setting forth weights of sections used in one or more artificial intelligence models utilized by the video analysis tool 10, process 200, and system 300 of FIGS. 1-3. The screen 800 includes an intermediate screen display 802 and a side display bar 804, with the intermediate screen display 802 depending on the selection of a feature and/or sub-feature on the side display bar 804. For example, the side display bar 804 includes the features of Classes, Organizations, Access Keys, and Advisor 814. The Advisor feature 814 includes the sub-features of Sections 816, Criterion 818, Section Messages 820, and Criteria Message 822.

Selection of the Sections 816 sub-feature of the Advisor 814 feature provides the screen 800 including the intermediate screen display 802 entitled Advisor Section configured to determine feedback given in, for example, the overall recommendations area 720 of FIG. 7. The Advisor Section intermediate screen display 802 includes a Name column 806, a Weight column 808, a Prefix column 810, a binary-coded decimal (BCD) Number column 812, and Page options area 814. The Name column 806 includes the presentation portions of Introduction, Delivery, Body, and Conclusion. The Weight column 808 lists the weights assigned to and/or otherwise associated with the respective presentation portions of the Name column 806. The Prefix column 810 lists the prefixes associated with the respective presentation portions of the Name column 806. The BCD Number column 812 lists the BCD Number associated with the respective presentation portions of the Name column 806. The BCD Number is representative of a class of binary encodings of decimal numbers with each decimal digit represented by a fixed number of bits as understood to those skilled in the art. In the embodiment of FIG. 8, 1 is the BCD Number associated with the Introduction presentation portion, 2 is the BCD Number is associated with the Delivery presentation portion, 4 is the BCD Number associated with the Body presentation portion, and 8 is the BCD Number associated with the Conclusion presentation portion.

Figure 9:
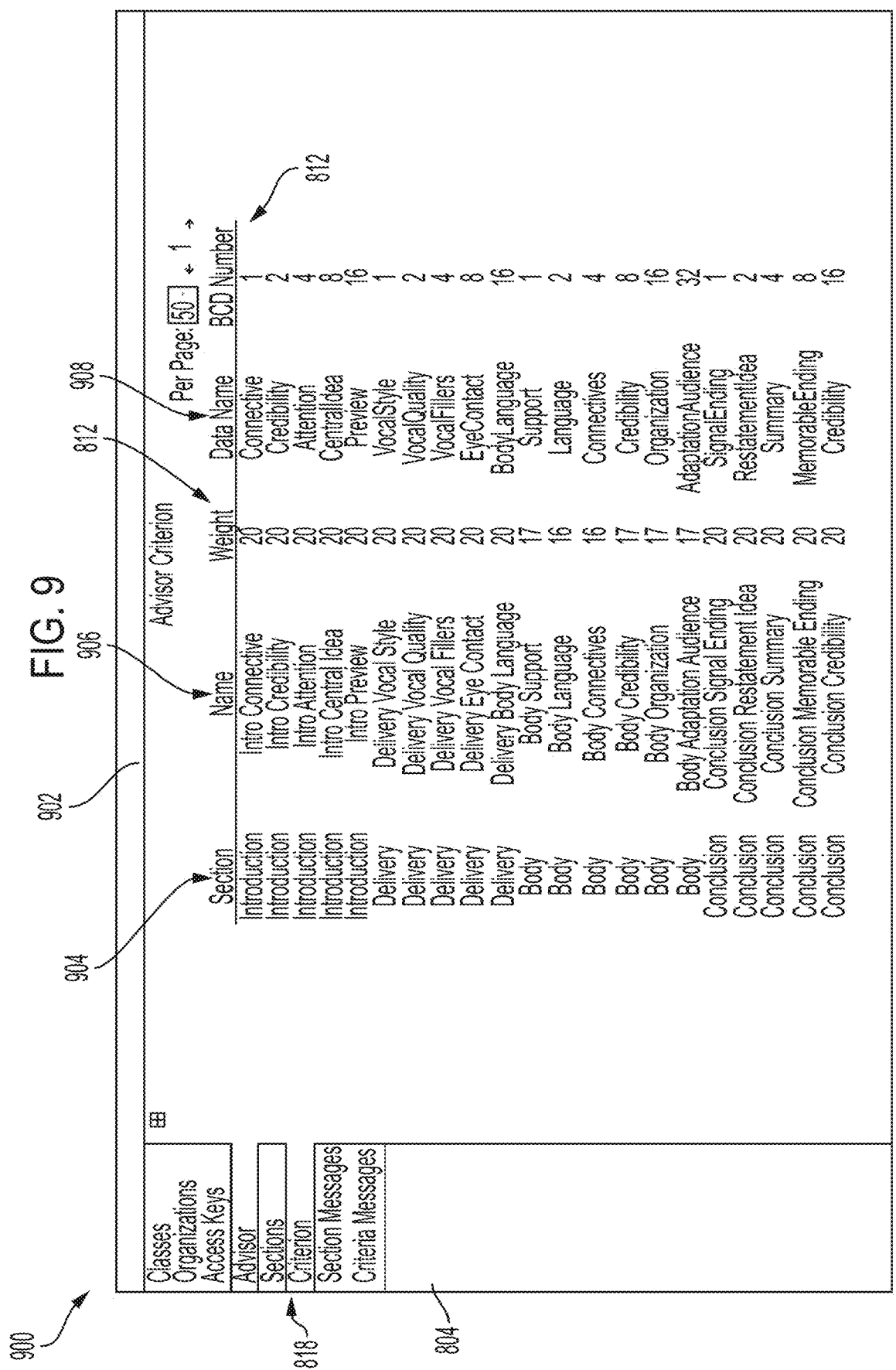
FIG. 9 illustrates a screen setting forth criteria weighted within each section in the one or more artificial intelligence models utilized by the video analysis tool, process, and system of FIGS. 1-3 to determine feedback given in the overall area of recommendations of FIG. 7.

Selection of the Criterion 818 sub-feature of the Advisor 814 feature as shown in the side display bar 804 of FIG. 8 provides a screen 900 of FIG. 9 including an intermediate display screen 902 entitled Advisor Criterion to display an Advisor Criterion screen. The Advisor Criterion screen is configured to associate criteria (e.g., parameters to analyze) with weights in each presentation portion section to determine feedback to be given by the video analysis tool 10. The Advisor Criterion screen sets forth criteria weighted within each section of a Section column 904 in the one or more artificial intelligence models utilized by the video analysis tool 10, process 200, and system 300 of FIGS. 1-3. Each section of the Section column 904 corresponds to a presentation portion of Introduction, Delivery, Body, and Conclusion in FIG. 9, which further correspond to different presentation portion parameters listed in the Name column 906 of FIG. 9. Such parameters may be those selected from the plurality of parameters of FIG. 4, for example, for each corresponding presentation portion. Each presentation portion parameter listed in the Name column 906 corresponds to and is associated with a weight in the Weight column 812, a data name in the Data Name column 912, and a BCD Number in the BCD Number column 812. As a non-limiting example, the first listed Introduction presentation portion in the Section column 904 corresponds to an Intro Connective parameter listed in the Name column 904 that has a weight of 20 in the Weight column 812, a data name of Connective in the Data Name column 912, and a BCD Number of 1 in the BCD Number column 812 of FIG. 9.

Selection of the Section Messages 820 sub-feature of the Advisor 814 feature as shown in the side display bar 804 of FIG. 8 provides a screen 1000 of FIG. 10 including an intermediate display screen 1002 entitled Advisor Section Feedback Messages to display an Advisor Section Feedback Messages screen. The Advisor Section Feedback Messages screen sets forth messages for sections used in the one or more artificial intelligence models utilized by the video analysis tool 10, process 200, and system 300 of FIGS. 1-3, such as to provide with the feedback given in the overall recommendations area 720 or other recommendations areas of FIG. 7. The Advisor Section Feedback Messages screen includes a Code column 1004, a Section Names column 1006, and a Message column 1006. Each code from a list of code numbers in the Code column 1004, shown in sequence from 1-15 in FIG. 10, is associated with a different section name that sets forth a single presentation or more than one presentation portions listed in the Section Names column. Each code associated listed section name corresponds to a message listed in the Message column 1008.

Selection of the Criteria Message 822 sub-feature of the Advisor 814 feature as shown in the side display bar 804 of FIG. 8 provides a screen 1100 of FIG. 11 including an intermediate display screen 1102 entitled Advisor Criteria Feedback Message to display an Advisor Criteria Feedback Messages screen. The Advisor Criteria Feedback Messages screen sets forth messages for sections used in the one or more artificial intelligence models utilized by the video analysis tool 10, process 200, and system 300 of FIGS. 1-3 to provide with the feedback given for the presentation portions of introduction, body, conclusion, and delivery as associated recommendations in the respective presentation portion recommendations 722, 726, 728, 724 of FIG. 7. The Advisor Criteria Feedback Messages screen displays a Section column 1104, a Code column 1106, a Criteria Name column 1108, and a Message column 1110. The Section column 1104 lists different presentation portions, such as Introduction, Body, Delivery, and Conclusion. Each listed presentation portion is associated with a code in Code column 1106, a criteria name as a parameter in the Criteria Name column 1108, and corresponding message in the Message column 1110. As a non-limiting example, in the first row of FIG. 11, the Introduction presentation portion as shown in the Section column 1104 is associate with a code of 1 in the Code column 1106 that is associated with a Connective parameter in the Criteria Name column 1108 and a respective message in the Message column 1110 regarding analysis of the Connective parameter in the Introduction by the video analysis tool 10.

Messages may be added to (and/or edited within) the video analysis tool 10 as well. FIG. 12 shows a display 1200 of an example new criteria message entry to create feedback based on a criteria (e.g., analyzed parameter) to be improved within a certain presentation portion of the presentation 114. The display 1200 includes a New Criteria Message screen 1202 with a Section field area 1204, a Criterion field area 1206, a Code field area 1208, a Message field area 1210, a Cancel button 1212, and a Create button 1214. The field areas may include a drop down option 1216, such as the Section field area 1204 in FIG. 12 from which a type of presentation portion may be selected. The selected presentation portion in FIG. 12 is Introduction. Selected criterion in the Criterion field area 1206 are the Intro Connective and the Intro Credibility Parameters, for which a Code 3 is displayed in the Code field area 1208, which corresponds to the Code 3 listing in the Code column 1106 of FIG. 11. In embodiments, the code is generated based on which criteria are set through a binary value assignment. Intro Connective having a four-bit binary value of 0001 and Intro Credibility having a four-bit binary value of 0010 add up to 0011, which is the decimal digit of 3 and thus is set as Code 3. An associated new message may be typed into the Message field area 1208. The Create button 1214 may be selected to enter and create the New Criteria Message.

In embodiments as described herein, a video analysis system 300 may include a display 110, one or more processors 304 communicatively coupled to the display 110, one or more memory components 306 communicatively coupled to the one or more processors 304, and machine-readable instructions stored in the one or more memory components 306. The machine-readable instructions may cause the video analysis system 300 to, when executed by the one or more processors 304, receive an input of a digital recording of a presentation 114, and analyze, via a video analysis neural network model, the digital recording of the presentation 114 based on one or more feedback parameters (e.g., such as the plurality of parameter 400 shown in FIG. 4), associated with a delivery of the presentation 114, one or more presentation portions of the presentation 114, or combinations thereof. Further, the video analysis system 300 may be caused to generate, via the video analysis neural network model (e.g., through the feedback generation module 316, and as automatically provided feedback in block 206) one or more feedback information 514, one or more recommendations (e.g., recommendations of areas 722, 724, 726, 728), or combinations thereof for an overall segment of the presentation 114, the delivery of the presentation 114, and each of the one or more presentation portions of the presentation 114, and display the one or more recommendations and the one or more feedback information 514 on the display 110.

In embodiments, and as shown in FIG. 5, the one or more feedback information 514 may include a feedback data associated with a presentation length 502, a talk speed 504, and a vocal filler 506 utilization of the presentation 114. The feedback data associated with the presentation length 502 may include a total number of words and a duration time length of the presentation 114. The feedback data associated with the talk speed 504 may include an output of words per minute of the presentation 114. The feedback data associated with the vocal filler 506 utilization may include a percentage of the vocal fillers were used relative to the total number of words.

The machine-readable instructions may further cause the video analysis system 300 to, when executed by the one or more processors 304, and via the video analysis neural network model, generate a body heat map 600 (FIG. 6) of a presenter of the presentation (e.g., the individual 102) based on the digital recording of the presentation 114, and analyze the digital recording of the presentation 114 based on the one or more feedback parameters (e.g., the plurality of parameters 400 of FIG. 4) and the body heat map 600 (FIG. 6) of the presenter.

In embodiments, and as described herein, the one or more feedback parameters may include one or more criterion. Each of the one or more criterion may include a respective weight in the video analysis neural network model and a binary-coded decimal (BCD) number, as shown in FIGS. 8-9. Each of the one or more criterion is associated with the delivery of the presentation 114, the one or more presentation portions of the presentation 114, or combinations thereof. As shown in FIGS. 10-11, the delivery of the presentation 114 and the one or more presentation portions of the presentation 114 may be individually or in combination associated with a code based on the associated BCD number. Each code may be associated with a message related to the respective one or more criterion.

In further embodiments, and as described herein, the one or more presentation portions may include the introduction, the body, and the conclusion of the presentation 114. The one or more feedback parameters of the plurality of parameters 400 (FIG. 4) associated with the introduction of the presentation 114 may include credibility, attention, central idea, preview, connective, or combinations thereof. The one or more feedback parameters of the plurality of parameters 400 associated with the body of the presentation 114 may include support, language, connectives, credibility, organization, adaptation audience, or combinations thereof. The one or more feedback parameters of the plurality of parameters 400 associated with the conclusion of the presentation 114 may include signaling ending, restatement idea, summary, memorable ending, credibility, or combinations thereof. The one or more feedback parameters of the plurality of parameters 400 associated the delivery of the presentation 114 may include vocal style, vocal quality, vocal fillers, eye contact, body language, or combinations thereof.

As shown in FIG. 12, the machine-readable instructions may further cause the video analysis system 300 to, when executed by the one or more processors 304, receive in an input screen (e.g., the New Criteria Message screen 1202) a new message (e.g., entered into the Message field area 1210) to associate with the one or more feedback parameters associated with the delivery of the presentation 114, the one or more presentation portions of the presentation 114, or combinations thereof. The instructions may further cause the video analysis system 300 to be configured to associate the new message with a code (e.g., in the Code field area 1208) based on an associated BCD number of the one or more feedback parameters, create the new message, and display the new message as one of the one or more recommendations on the display 110, 1200. The code may be based on a summation of the associated BCD numbers when more than one feedback parameters are provided in the input screen.

In embodiments, the video analysis tool 10 is configured to provide a centralized platform to streamline and automatically provide feedback for presentations, which reduces or eliminates a delay time associated with otherwise manual feedback of such presentations. Such a reduction in the delay time assists with improving latency, efficiency, and processing time associated with presenting the presentation through use of the video analysis tool 10. Through use of the video analysis tool 10 and systems and methods described herein, teaching and learning of public speaking skills may be improved in classrooms along with aid of the generated automatic evaluations and recommendations.

Students may be provided with automated feedback during practice sessions to continuation to improve upon presentation skills and after presenting a final presentation. Such automated feedback may be directed to metrics of voice quality, an analysis of content/message delivery and organization of the analyzed presentation, visual, audible, or other performance feedback, or combinations thereof. Users such as students giving the presentation may be presented with generated recommendations, such as recommendations to practice more with respect to particular presentation portions, based on particular analyzed criteria, and with respect to an overall presentation and associated aspects such as presentation length, speed, and use of vocal fillers to improve upon such aspects with practice. Instructors may utilize the generated automatic analysis content and recommendations for grading purposes or to otherwise aid student improvement. It is contemplated and within the scope of this disclosure that the video analysis tool may be configured to be a virtual instructor provided automated grading or other feedback in an institutional or other setting. Use of the video analysis tool, systems, and methods as described herein aids to enable a user to become a more proficient speaker while employing an efficient and optimal processing methodology to generate recommendations to the user to aid in this improvement.

Aspects Listing

Aspect 1. A video analysis system, comprising a display, one or more processors communicatively coupled to the display, one or more memory components communicatively coupled to the one or more processors, and machine-readable instructions stored in the one or more memory components that cause the video analysis system to perform at least the following when executed by the one or more processors: receive an input of a digital recording of a presentation; analyze, via a video analysis neural network model, the digital recording of the presentation based on one or more feedback parameters associated with a delivery of the presentation, one or more presentation portions of the presentation, or combinations thereof; generate, via the video analysis neural network model, one or more feedback information, one or more recommendations, or combinations thereof for an overall segment of the presentation, the delivery of the presentation, and each of the one or more presentation portions of the presentation; and display the one or more recommendations and the one or more feedback information on the display.

Aspect 2. The video analysis system of Aspect 1, wherein the one or more presentation portions comprise an introduction, a body, and a conclusion of the presentation.

Aspect 3. The video analysis system of Aspect 2, wherein the one or more feedback parameters associated with the introduction of the presentation comprise credibility, attention, central idea, preview, connective, or combinations thereof.

Aspect 4. The video analysis system of any of Aspect 2 to Aspect 3, wherein the one or more feedback parameters associated with the body of the presentation comprise support, language, connectives, credibility, organization, adaptation audience, or combinations thereof.

Aspect 5. The video analysis system of any of Aspect 2 to Aspect 4, wherein the one or more feedback parameters associated with the conclusion of the presentation comprise signaling ending, restatement idea, summary, memorable ending, credibility, or combinations thereof.

Aspect 6. The video analysis system of any of Aspect 1 to Aspect 5, wherein the one or more feedback parameters associated the delivery of the presentation comprise vocal style, vocal quality, vocal fillers, eye contact, body language, or combinations thereof.

Aspect 7. The video analysis system of any of Aspect 1 to Aspect 6, wherein the machine-readable instructions further cause the video analysis system to generate, via the video analysis neural network model, a body heat map of a presenter of the presentation based on the digital recording of the presentation, and analyze, via the video analysis neural network model, the digital recording of the presentation based on the one or more feedback parameters and the body heat map of the presenter.

Aspect 8. The video analysis system of any of Aspect 1 to Aspect 7, wherein the one or more feedback parameters comprise one or more criterion, each of the one or more criterion comprising a respective weight in the video analysis neural network model and a binary-coded decimal (BCD) number.

Aspect 9. The video analysis system of Aspect 8, wherein each of the one or more criterion is associated with the delivery of the presentation, the one or more presentation portions of the presentation, or combinations thereof.

Aspect 10. The video analysis system of Aspect 9, wherein the delivery of the presentation and the one or more presentation portions of the presentation are individually or in combination associated with a code based on the associated BCD number.

Aspect 11. The video analysis system of Aspect 10, wherein each code is associated with a message related to the respective one or more criterion.

Aspect 12. The video analysis system of any of Aspect 1 to Aspect 11, wherein the machine-readable instructions further cause the video analysis system to receive in an input screen a new message to associate with the one or more feedback parameters associated with the delivery of the presentation, the one or more presentation portions of the presentation, or combinations thereof, associate the new message with a code based on an associated BCD number of the one or more feedback parameters, create the new message, and display the new message as one of the one or more recommendations on the display.

Aspect 13. The video analysis system of Aspect 12, wherein the code is based on a summation of the associated BCD numbers when more than one feedback parameters are provided in the input screen.

Aspect 14. The video analysis system of any of Aspect 1 to Aspect 13, wherein the one or more feedback information comprise a feedback data associated with a presentation length, a talk speed, and a vocal filler utilization of the presentation.

Aspect 15. The video analysis system of Aspect 14, wherein the feedback data associated with the presentation length comprises a total number of words and a duration time length of the presentation, the feedback data associated with the talk speed comprises an output of words per minute of the presentation, and the feedback data associated with the vocal filler utilization comprises a percentage of the vocal fillers were used relative to the total number of words.

Aspect 16. A video analysis system, comprising a display, one or more processors communicatively coupled to the display, one or more memory components communicatively coupled to the one or more processors, and machine-readable instructions stored in the one or more memory components that cause the video analysis system to perform at least the following when executed by the one or more processors: receive an input of a digital recording of a presenter of a presentation; generate, via a video analysis neural network model, a body heat map of the presenter of the presentation based on the digital recording of the presentation; and analyze, via the video analysis neural network model, the digital recording of the presentation based on one or more feedback parameters associated with a delivery of the presentation, one or more presentation portions of the presentation, or combinations thereof and the body heat map. The one or more presentation portions comprise an introduction, a body, and a conclusion of the presentation. The machine-readable instructions further cause the video analysis system to perform at least the following when executed by the one or more processors: generate, via the video analysis neural network model, one or more feedback information, one or more recommendations, or combinations thereof for an overall segment of the presentation, the delivery of the presentation, and each of the one or more presentation portions of the presentation, and display the one or more recommendations and the one or more feedback information on the display.

Aspect 17. The video analysis system of Aspect 16, wherein the one or more feedback parameters associated the delivery of the presentation comprise vocal style, vocal quality, vocal fillers, eye contact, body language, or combinations thereof, the one or more feedback parameters associated with the introduction of the presentation comprise credibility, attention, central idea, preview, connective, or combinations thereof, the one or more feedback parameters associated with the body of the presentation comprise support, language, connectives, credibility, organization, adaptation audience, or combinations thereof, and the one or more feedback parameters associated with the conclusion of the presentation comprise signaling ending, restatement idea, summary, memorable ending, credibility, or combinations thereof.

Aspect 18. The video analysis system of Aspect 16 or Aspect 17, wherein the machine-readable instructions further cause the video analysis system to receive in an input screen a new message to associate with the one or more feedback parameters associated with the delivery of the presentation, the one or more presentation portions of the presentation, or combinations thereof, associate the new message with a code based on an associated BCD number of the one or more feedback parameters, wherein the code is based on a summation of the associated BCD numbers when more than one feedback parameters are provided in the input screen, create the new message, and display the new message as one of the one or more recommendations on the display.

Aspect 19. A method using a video analysis system including a display to provide automated feedback regarding a presentation, the method comprising receiving, via the video analysis system, an input of a digital recording of the presentation, analyzing, via a video analysis neural network model of the video analysis system, the digital recording of the presentation based on one or more feedback parameters associated with a delivery of the presentation, one or more presentation portions of the presentation, or combinations thereof, generating, via the video analysis neural network model, one or more feedback information, one or more recommendations, or combinations thereof for an overall segment of the presentation, the delivery of the presentation, and each of the one or more presentation portions of the presentation, and displaying the one or more recommendations and the one or more feedback information on the display of the video analysis system.

Aspect 20. The method of Aspect 19, further comprising generating, via the video analysis neural network model, a body heat map of a presenter of the presentation based on the digital recording of the presentation, analyzing, via the video analysis neural network model, the digital recording of the presentation based on the one or more feedback parameters and the body heat map of the presenter.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A video analysis system, comprising:
   a display;
   one or more processors communicatively coupled to the display;
   one or more memory components communicatively coupled to the one or more processors; and
   machine-readable instructions stored in the one or more memory components that cause the video analysis system to perform at least the following when executed by the one or more processors:
   receive an input of a digital recording of a presentation;
   generate, via a video analysis neural network model, a body heat map of the presenter of the presentation based on the digital recording of the presentation, the body heat map including one or more identified portions of a body of the presenter that move during the presentation;
   analyze, via video analysis neural network model, the digital recording of the presentation based on one or more feedback parameters associated with a delivery of the presentation and at least two presentation portions of the presentation, wherein at least one feedback parameter for one presentation portion is different from at least one other feedback parameter for another presentation portion of the at least two presentation portions of the presentation;
   generate, via the video analysis neural network model, one or more feedback information, one or more recommendations, or combinations thereof for an overall segment of the presentation, the delivery of the presentation, and each of the at least two presentation portions of the presentation; and
   display the one or more recommendations and the one or more feedback information on the display.

2. The video analysis system of claim 1, wherein the one or more presentation portions comprise an introduction, a body, and a conclusion of the presentation.

3. The video analysis system of claim 2, wherein the one or more feedback parameters associated with the introduction of the presentation comprise credibility, attention, central idea, preview, connective, or combinations thereof.

4. The video analysis system of claim 2, wherein the one or more feedback parameters associated with the body of the presentation comprise support, language, connectives, credibility, organization, adaptation audience, or combinations thereof.

5. The video analysis system of claim 2, wherein the one or more feedback parameters associated with the conclusion of the presentation comprise signaling ending, restatement idea, summary, memorable ending, credibility, or combinations thereof.

6. The video analysis system of claim 1, wherein the one or more feedback parameters associated the delivery of the presentation comprise vocal style, vocal quality, vocal fillers, eye contact, body language, or combinations thereof.

7. The video analysis system of claim 1, wherein the machine-readable instructions further cause the video analysis system to
   generate, via the video analysis neural network model, a body heat map of a presenter of the presentation based on the digital recording of the presentation; and
   analyze, via the video analysis neural network model, the digital recording of the presentation based on the one or more feedback parameters and the body heat map of the presenter.

8. The video analysis system of claim 1, wherein the one or more feedback parameters comprise one or more criterion, each of the one or more criterion comprising a respective weight in the video analysis neural network model and a binary-coded decimal (BCD) number.

9. The video analysis system of claim 8, wherein each of the one or more criterion is associated with the delivery of the presentation, the at least two presentation portions of the presentation, or combinations thereof.

10. The video analysis system of claim 9, wherein the delivery of the presentation and the at least two presentation portions of the presentation are individually or in combination associated with a code based on the associated BCD number.

11. The video analysis system of claim 10, wherein each code is associated with a message related to the respective one or more criterion.

12. The video analysis system of claim 1, wherein the machine-readable instructions further cause the video analysis system to
receive in an input screen a new message to associate with the one or more feedback parameters associated with the delivery of the presentation, the at least two presentation portions of the presentation, or combinations thereof;
associate the new message with a code based on an associated BCD number of the one or more feedback parameters;
create the new message; and
display the new message as one of the one or more recommendations on the display.

13. The video analysis system of claim 12, wherein the code is based on a summation of the associated BCD numbers when more than one feedback parameters are provided in the input screen.

14. The video analysis system of claim 1, wherein the one or more feedback information comprise a feedback data associated with a presentation length, a talk speed, and a vocal filler utilization of the presentation.

15. The video analysis system of claim 14, wherein:
the feedback data associated with the presentation length comprises a total number of words and a duration time length of the presentation;
the feedback data associated with the talk speed comprises an output of words per minute of the presentation; and
the feedback data associated with the vocal filler utilization comprises a percentage of the vocal fillers were used relative to the total number of words.

16. A video analysis system, comprising:
a display;
one or more processors communicatively coupled to the display;
one or more memory components communicatively coupled to the one or more processors; and
machine-readable instructions stored in the one or more memory components that cause the video analysis system to perform at least the following when executed by the one or more processors:
receive an input of a digital recording of a presenter of a presentation;
generate, via a video analysis neural network model, a body heat map of the presenter of the presentation based on the digital recording of the presentation;
analyze, via the video analysis neural network model, the digital recording of the presentation based on one or more feedback parameters associated with a delivery of the presentation, one or more presentation portions of the presentation, or combinations thereof and the body heat map, wherein the one or more presentation portions comprise an introduction, a body, and a conclusion of the presentation;
generate, via the video analysis neural network model, one or more feedback information, one or more recommendations, or combinations thereof for an overall segment of the presentation, the delivery of the presentation, and each of the one or more presentation portions of the presentation; and
display the one or more recommendations and the one or more feedback information on the display.

17. The video analysis system of claim 16, wherein:
the one or more feedback parameters associated the delivery of the presentation comprise vocal style, vocal quality, vocal fillers, eye contact, body language, or combinations thereof;
the one or more feedback parameters associated with the introduction of the presentation comprise credibility, attention, central idea, preview, connective, or combinations thereof;
the one or more feedback parameters associated with the body of the presentation comprise support, language, connectives, credibility, organization, adaptation audience, or combinations thereof; and
the one or more feedback parameters associated with the conclusion of the presentation comprise signaling ending, restatement idea, summary, memorable ending, credibility, or combinations thereof.

18. The video analysis system of claim 16, wherein the machine-readable instructions further cause the video analysis system to
receive in an input screen a new message to associate with the one or more feedback parameters associated with the delivery of the presentation, the one or more presentation portions of the presentation, or combinations thereof;
associate the new message with a code based on an associated BCD number of the one or more feedback parameters, wherein the code is based on a summation of the associated BCD numbers when more than one feedback parameters are provided in the input screen;
create the new message; and
display the new message as one of the one or more recommendations on the display.

19. A method using a video analysis system including a display to provide automated feedback regarding a presentation, the method comprising:
receiving, via the video analysis system, an input of a digital recording of the presentation;
generating, via a video analysis neural network model, a body heat map of the presenter of the presentation based on the digital recording of the presentation, the body heat map including one or more identified portions of a body of the presenter that move during the presentation;
analyzing, via the video analysis neural network model of the video analysis system, the digital recording of the presentation based on one or more feedback parameters associated with a delivery of the presentation, one or more presentation portions of the presentation, or combinations thereof and a portion of the one or more identified portions the body heat map;
generating, via the video analysis neural network model, one or more feedback information, one or more recommendations, or combinations thereof for an overall segment of the presentation, the delivery of the presentation, and each of the one or more presentation portions of the presentation; and
displaying the one or more recommendations and the one or more feedback information on the display of the video analysis system.

* * * * *